United States Patent [19]

Thijssen

[11] 3,872,009

[45] Mar. 18, 1975

[54] APPARATUS FOR THE SEPARATION AND TREATMENT OF SOLID PARTICLES FROM A LIQUID SUSPENSION

[76] Inventor: Henricus Alexis Cornelis Thijssen, Rontgenlaan 2, Son, Netherlands

[22] Filed: Sept. 20, 1973

[21] Appl. No.: 399,112

[63] Continuation-in-part of Ser. No. 156,717, June 25, 1971, Pat. No. 3,777,892.

[30] Foreign Application Priority Data

Sept. 26, 1972 Netherlands .................... 7212995

[52] U.S. Cl. ............... 210/178, 210/179, 210/184, 210/398, 210/408, 210/447, 210/454, 210/474, 23/273 F
[51] Int. Cl. ........................................... B01d 29/00
[58] Field of Search ........... 210/178, 179, 185, 359, 210/447, 459, 408, 66, 67, 474; 110/8 E, 9 E, 18 E; 260/707; 23/273 R, 273 F, 273 SP

[56] References Cited
UNITED STATES PATENTS

| | | | |
|---|---|---|---|
| 2,770,533 | 11/1956 | Kahmann et al. ................ | 23/273 F |
| 2,854,494 | 9/1958 | Thomas .............................. | 260/707 |
| 2,855,100 | 10/1958 | Findlay .............................. | 210/91 |
| 2,922,701 | 1/1960 | Ratje ................................. | 23/273 F |
| 3,290,891 | 12/1966 | DeLano, Jr. et al. ................ | 210/71 |
| 3,383,228 | 5/1968 | Rekate et al. ....................... | 110/8 |
| 3,512,940 | 5/1970 | Shapiro ............................. | 210/359 |
| 3,550,775 | 12/1970 | Cooley .............................. | 210/81 |
| 3,777,892 | 12/1973 | Thijssen ........................... | 210/178 |

*Primary Examiner*—Charles N. Hart
*Assistant Examiner*—F. F. Calvetti
*Attorney, Agent, or Firm*—Sherman & Shalloway

[57] ABSTRACT

Apparatus for separation and purification of solids from a suspension and for leaching solid particles including an impervious column having a piston at one end through which a liquid suspension of solid particles is supplied and through which the suspension liquid is removed. The piston is reciprocated to form a bed of solid particles at the other end of the column from which the particles are progressively removed by melting or by mechanical scrapers with wash liquid being passed through the bed for cleaning or leaching purposes.

In a second embodiment the bed of solid particles is formed by reciprocating the mechanical scrapers.

18 Claims, 4 Drawing Figures

APPARATUS FOR THE SEPARATION AND TREATMENT OF SOLID PARTICLES FROM A LIQUID SUSPENSION

This application is a continuation-in-part of U.S. Pat. application Ser. No. 156,717 filed June 25, 1971 now U.S. Pat. No. 3,777,892.

This invention relates to apparatus for the separation and purification of solids from a suspension, and for leaching solid particles.

A complete extraction of solids by leaching or a separation and purification of solid particles from a suspension can be obtained by washing the solid particles in counter currents with a washing fluid. The leaching or separation and purification can be effected in wash columns. In wash columns a suspension of solid particles in a liquid is fed to one end of the column, and the leached or washed solid particles are removed at the other end. The washing fluid is introduced into the column at or near to the end of the column where the solid particles are removed. Liquid is removed from the column at or near to the other end. If the solid particles can be melted it is possible to remove them from the column in the molten state. In this case the melt of the purified solids can be used as washing fluid.

A wash column for the separation and purification of crystals from their mother liquor operating with a piston is described in the U.S. Pat. No. Re. 23,810, while in the U.S. Pat. No. 2,854,494 a pulsating unit is described. In both processes crystal suspension is fed to one end of an elongated cylindrical column, the mother liquor along with a portion of the washing liquid is removed near the centre of the column through a filter in the wall of the column, and the compacted crystal mass is forced towards the other end of the column, where the crystals are completely melted, one portion of this crystal melt is removed and the other portion of the melt is returned as washing liquid in counter currents with the crystal bed, to displace the mother liquor left in between the crystals of the compacted bed.

It is a drawback of these processes, that both the mother liquor and the washing liquid are removed through the wall of the wash column. The washing liquid moves from the melting end to the wall filter along the paths of least resistance. These paths of least resistance are formed by the flow pattern diverging from the melting or washing end to the wall filter. Consequently the compact cylindrical crystal mass is flushed to a decreasing degree by washing liquid, going radially inwardly to the centre so that the washing effect will decrease. Therefore the planes in the crystal mass connecting points of equal concentration of remaining mother liquor will bulge considerably in the centre in the direction in which the central mass moves. For those mixtures in which the mother liquor has a higher viscosity than the washing liquid this bulge in the washing front is enhanced even further and practically only the outermost layer of the crystal mass will be washed. If the melt of the crystals is used as washing liquid, the washing of the outermost layer of the cylinder is also incomplete, since this is effected with a mixture of molten crystals and mother liquor which has been entrained towards the melter with the layers lying nearer to the centre of the crystal cylinder. This unfavorable effect of a filter fitted in the wall of the wash column on the separation of crystals and mother liquor is naturally enhanced with an increase of the diameter-length ratio of the wash column.

Neither is this problem solved by the apparatus described in the U.S. Pat. Nos. 2,885,431 and 2,886,587, in which the mother liquor can be removed from the crystal bed by means of a perforated piston which shuts off the crystal bed on the side of the washing column away from the melter. With this apparatus, the mother liquor can be removed and the washing liquid fed in a direction parallel and opposite to the direction of movement of the crystals. Nevertheless, no homogeneous flow through the crystal bed is obtained. This is because the suspension is fed near the central part of the column on one side to the crystal bed that has already been compacted during the compression stroke of the perforated piston. The feeding of the crystal suspension is provided for by a pumping device located outside the wash columns. By this feeding method the crystals are compacted irregularly over the cross section. Moreover the concentration of the dissolved substance in the liquid phase will be higher near the feeding point of the suspension than on the side remote from the feeding point. Since a difference in concentration in the liquid as a rule also implies a difference of viscosity in the liquid, a disturbance of the concentration profile produced near the feeding point of the suspension will be enhanced. If the viscosity of the washing liquid is lower than that of the mother liquor, the mother liquor will move as a bulge in the direction of the melter. If, by means of the wash columns described in the aforesaid patent specifications, crystals are purified from the mother liquor by counter-current washing with the melt of the crystals, there will also take place a considerable channeling of the washing liquid. These channels of washing liquid in the crystal bed extend from the melting front of the crystal bed to the neighbourhood of the wall filter where the mother liquor and the washing liquid are removed. Since the washing liquid meets with practically no flow resistance in these channels, only a very small portion of the washing liquid will flow through the compact crystals and the washing of the crystal bed accordingly will become even less satisfactory.

A method and apparatus for obtaining a completely flat washing front perpendicular to the direction of movement of the compacted solid particles has been described in U.S. Pat. application Ser. No. 156,717 filed June 25, 1971 now U.S. Pat. No. 3,777,892. This was accomplished by removing washing liquid and suspension liquid through a perforated filter forming the upper surface of a piston which closed the wash column at the end opposite to the direction of the movement of the bed of solids, feeding the suspension of solid particles through the same piston, compacting the solid particles in a plane perpendicular to their travel by reciprocating the piston, feeding the washing liquid to the compacted solid particles over the perpendicular plane and treating the washed compacted bed to facilitate its removal from the wash column.

It has now been discovered that according to the above described principles it is also possible to achieve a completely flat washing front by compacting the solid particles at the end of the column opposite from the feed location of the supply of the suspension of solid particles and the removal of the liquid phase of the suspension. The washed compacted bed of solid particles is still removed at the opposite end of the wash column, i.e. at the end which includes the treating means for the compacted bed. Using this latter approach the treating means for the removal of the compacted and washed solid particles moves in an axial direction while the perforated filter having passages for supply of the slurry and removal of the liquid phase remains stationary. The basic concept of either type of apparatus remains the same. That is, that in order to accomplish a sharp separation between crystals and mother liquor, it is necessary to create within the washing column a homogeneous bed of crystals with a sharp divisional line, i.e. washing front, between washed and not yet washed crystals. The divisional line must be perpendicular to the axis of the column and also must remain stable and in a substantially stationary position.

Regardless of the approach which is taken to achieve the flat washing front several problems have been encountered, some of which may be particularly troublesome only when using the reciprocating piston. Thus, for example, in the apparatus described in U.S. Pat. No. 3,777,892 the piston must be freed, at the beginning of the filling (i.e. suction or downward) stroke, from the compacted bed of solid particles in contact with the piston-filter surface. It is also necessary to prevent the formation of crystal lumps in the suspension supply pipe-line which has been observed to occur primarily during the compression phase when the suspension is supplied under pressure.

Problems have been encountered also when using mechanical treating means although, in general, a rotating disc with scrapers has been found to be the most advantageous and economical treating means. Specifically, poor mixing of the washing liquid has been noted, even with an auxiliary mixing bar connected to the axle of the rotating disc. Other inefficiencies have been encountered with regard to the specific arrangement of the rotating disc with scrapers.

It has also been found that proper temperature control of the wash liquid and maintenance of the level of the washing front between the piston and the rotating disc also greatly improves performance.

It is therefore an object of the present invention to simply and economically solve each of the above problems using apparatus for the separation and purification of solids from a suspension and for leaching solid particles comprising an impervious column closed at one end with a filter having passageways for the supply of a suspension of solid particles in a liquid and for the removal of the liquid phase from the column; treating means at the opposite end of the column for treating successive portions of the solid particles to facilitate their removal from the column; a washing fluid supply means at the opposite end of the column for supplying washing fluid to the solid particles; and compression means for compressing successive portions of the bed with the mechanical treating means. According to a preferred embodiment of the present invention the mechanical treating means is a rotating disc carrying scrapers such as knife blades.

According to one feature of the present invention, when a reciprocating piston is used to compact the solid particles, the separation of the compacted solid particles from the piston surface is enhanced by incorporating an auxiliary cylinder having a double acting piston and pressure applying means connected thereto in communication with the pipeline for the discharge of the liquid phase of the suspension at a point between the discharge pipeline valve and the wash column.

According to another feature of the present invention the formation of crystal lumps in the suspension supply line is avoided by locating the valve means for the feed conduit not more than three times the diameter of the feed conduit below the surface of the piston on the side of the piston opposite the bed of solid particles.

According to an additional feature of the present invention in which a rotating disc carrying at least one scraper is used as the treating means there is provided means to maintain the disc stationary during a first phase of the compression stroke of the reciprocating piston and the same or additional means to cause rotation of the disc during a second phase (scrape/wash phase); this arrangement insures a satisfactory homogeneously stiff pressed-down crystal bed which is essential for the satisfactory operation of the apparatus.

According to still another feature of the rotating disc apparatus the rotating disc includes at least one knife blade, each blade having a single straight or finely toothed cutting edge, preferably the latter; the disc is also provided with at least one concentric groove on the closed surface of the disc which contacts the bed of solid particles and between the closed portions are openings in the form of angled or inclined slots. This arrangement is necessary to achieve satisfactory performance of the wash column, particularly during start-up of the column when there is not yet any crystal bed formed. During start-up, therefore the disc must deliver a counter-pressure on the suspension so as to flatten the solid (crystal) bed and to seal off the column as far as possible. During the scrape/wash phase the solid particles, e.g. ice, must be sufficiently discharged during the rotation of the disc; the washing liquid, e.g. water, must be uniformly fed to the solid bed, and to this end, sufficient space must be present between the solid particle bed and the disc. Additionally, the solid particle bed is kept as flat as possible by this arrangement of the rotating disc. Furthermore, in order to reduce the initial forces on the knives of the rotating disc, according to one feature of the present invention, the teeth of each such knife is staggered with respect to the teeth of each of the remaining knives; when only two knives are carried by the disc the teeth of one are staggered with respect to the teeth of the other over half the pitch of the teeth.

For the most satifactory operation of the wash column the temperature of the washing liquid must be maintained at the proper temperature level. According to still another feature of the present invention this is accomplished by recycling a portion of the washing liquid leaving the wash column through suitable discharge lines which includes a heat exchanger, in which the flow of heating medium there-through is regulated by a thermostat having its sensing probe located near the exit end of the heat exchanger. A first conduit connects the discharge line for the treated and washed solid bed with the inlet end of the heat exchanger back to the wash column, preferably via the washing liquid feed conduit or make-up supply line. A third conduit connects the first and second conduits to bypass the heat exchanger. The discharge of the remaining portion of the treated and washed solid particles (i.e. melt or product) is preferably passed through a second heat exchanger and connected by suitable piping to the discharge means for the melt. A discharge conduit is connected to the exit end of the second heat exchanger.

As indicated above, in order to obtain optimimum results it is necessary to maintain the divisional line, i.e. washing front, between washed and unwashed solid particles, e.g. crystals, substantially stationary at a position between the melter or mechanical treating means, e.g. rotating disc with scraper means, and the slurry feed location, e.g. piston. According to still yet another feature of the present invention this objective is achieved by incorporating a first automatically operated valve, e.g. magnetically operated, in the product-discharge conduit, particularly right after the second heat exchanger described above. At the outlet end of the first valve the discharge conduit is divided into a first branch and a second branch. The first branch includes a second automatically operated valve, e.g. magnetically operated; and the second branch includes an adjustable overflow valve. Suitable control means closes the first valve when the rotating disc is stationary and opens the first valve when the rotating disc is rotating. Second control means, preferably a photoelectric cell, is used to control the on/off position of the second valve in response to the location of the washing front in the wash column such that the second valve is opened when the washing front approaches the piston.

In an alternative embodiment an automatically operated, e.g. magnetic, three-way valve is incorporated into the product (melt) discharge conduit leaving the second heat exchanger. Control means for the valve includes a compressed air cylinder to one side of which air at a regulated reduced pressure is admitted through, for example, an automatically operated, e.g. magnetic, three-way valve, while to the other side of which air at atmospheric pressure is admitted through the same or a second automaticaly operated, e.g. magnetic three-way valve. Again, the valves associated with the compressed air cylinder are controlled by a photoelectric cell which emits a signal in response to the position of the washing front in the wash column.

Another problem has been encountered with washing columns having relatively large cross-sectional area. In particular, constructional difficulties can arise with the supply pipeline for the suspension and the discharge pipeline for the liquid phase of the suspension from the piston, and in such cases it has been necessary to use flexible or telescopic pipelines. In accordance with the principles of the present invention this problem can be solved by designing the wash column closed at one end with a filter having at least one passage there-through for the supply of suspension into the column and at least one passage there-through for the removal of the liquid phase of the suspension from the column, and with a rotating disc with scraper means at the opposite end of the column for treating successive portions of the solid particles to facilitate their discharge through the discharge means. Preferably the rotating disc is itself axially displaceable in the direction of the solid particles to act as the compacting means for the solid particles prior to treating the compacted bed of solid particles.

The invention will be better understood from the following description read with reference to the accompanying drawings in which.

Figure 1:
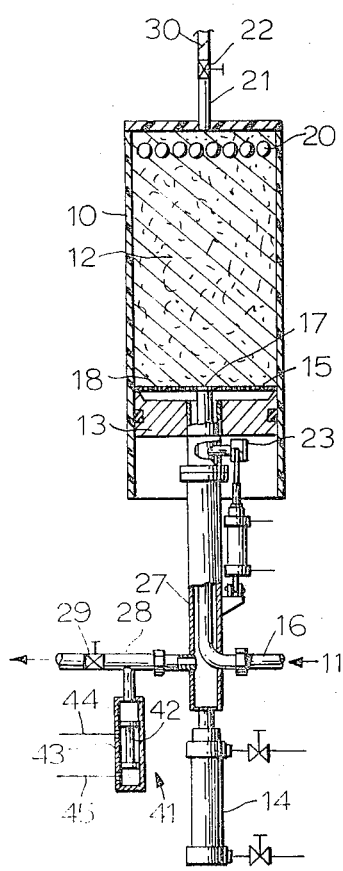
FIG. 1 shows schematically, one embodiment of the present invention with a melting grid.

Referring to FIG. 1, in the washing column 10, a bed of solid particles 12 is pressed together and compacted against treating means for facilitating the removal of the compacted bed from the wash column, in this embodiment, melting grid 20, by the piston 13. The piston 13 has a three-fold function: it serves as a pump for the supply of a suspension of solid particles 11 in a liquid to the washing column 10; it serves as a filter for the discharge of the liquid as well as for the compacting of the crystal during the compression stroke and pressing the crystal bed against the melting grid 20.

It is to be noted that the suspension of solid particles can also be pressed into the washing column by a separate pump. In this case of course the downward stroke of the piston 13 is forced by the pressure of the suspension being pressed into the washing column.

The liquid emerges via the filter 15 arranged on the surface 18 of the crystal bed side thereof. The suspension is supplied through the opening 17 in the piston surface via the suspension supply pipeline or conduit 16. The compressive force exerted by the piston 13 originates from the hydraulic or pneumatic suction-compression cylinder 14. The liquid which during the compression stroke of the piston is pressed out from between the solid particles, e.g. crystals, by the washing liquid, can escape via the filter 15 in the piston 13. The liquid issuing from the filter 15 is discharged via the pipe-line 27, which is concentrically arranged around the pipe-line 16, to the pipe-line 28.

The melting grid 20 comprises, for example, a flat grid of parallel arranged pipes which are internally heated by a heating medium. The distance between the gaps between the pipes makes escape of the molten particles possible. These molten particles are partially discharged via the pipe-line 21. The remaining portion of the molten particles stream back into the crystal bed as a reflux liquid to the liquid remaining after crystallisation and disperses amongst the compacted crystals to drive out the remaining liquid.

The valve 29 is open during the whole of the compression stroke of the piston. As soon as the piston 13 has reached the limit of its compression stroke, the valve 22 for the discharge of the melt and the valve 29 for the discharge of the liquid remaining after crystallisation are closed. The valve 23, in the pipe-line 16 for the supply of the suspension of solid particles in a liquid, is opened and the piston 13 is retracted downwardly by the suction-compression cylinder 14. During the retraction-suction stroke, the free surface of the compacted bed remains completely undisturbed, and a space becomes available between the limits of the piston 13 and the compacted bed 12. The free surface of the compacted bed 12 lies substantially parallel with the surface 18 of piston 13. The space between the compacted bed 12 and the filter 15 of the piston 13 fills homogeneously with the crystal suspension which is supplied via the pipe-line 16 during the suction stroke. When the piston 13 reaches the limit of its suction stroke, valve 23 closes again, the valve 29 is opened, and the piston 13 is again moved in the direction of the melting grid 20 by the suction-compression cylinder 14. During the first phase of the compression stroke of the piston 13, the liquid in the crystal suspension passes through the filter 15, via the pipe-line 27, to the discharge pipe-line 28. The first phase of the compression stroke is terminated when all the liquid freed from the suspension is discharged and solid particles, as a newly formed compacted bed, is formed on the earlier formed bed.

During the second phase of the compression stroke, a portion of the thickness of the bed is melted under the action of the pressure applied thereto by the piston 13, the portion of the thickness being equal to the volume of solid crystals applied to the bed during the first phase of the compression stroke. The discharge valve 22 is opened during the second part of the compression stroke. The adjustable butterfly valve 30 ensures the desired washing effect. The capacity of the washing column 10 is mainly determined by the rate at which the bed is melted. Through the compacting operation, the crystals in the suspension can be forced into the supply pipe-line 16. During the compression stroke, the upward movement of the piston 13 can lead to difficulties arising through the existance of a counter-pressure being exerted by the compact bed and liquid. Due to this, air can leak in and washing is made difficult and the column becomes filled because of the counter-pressurized suspension. A lump of crystals in the pipe-line 16 can also be of particular hindrance. It has been found that when the valve 23 is placed beneath the filter 15 and as close as possible thereto, this difficulty is eliminated to a high degree. The valve 23, therefor, is located, at the most, a distance of three times the diameter of the pipe-line 16 beneath the filter 15.

The freeing of the filter 15, at the beginning of the suction stroke, from the crystal bed 12 is further facilitated by the application thereto of a so-called pressure applicator 41. The pressure applicator 41 includes an auxiliary cylinder 43 in communication with the pipe-line 28 for the valve 19, and cylinder 43 is provided with a double acting piston 43. A source of pressure (not shown) is connected to cylinder 43 via pipe-lines 44 and 45. The cylinder 43 may be for example, one of the pneumatically operated types.

On the retraction-suction stroke of the piston 13, the portion of the column above the piston 13 becomes filled with liquid. The stroke capacity of the auxiliary cylinder 43 is only a few percent of that of the stroke volume of the column 10.

At the beginning of the filling, i.e. retraction-suction stroke, when the valve 29 is closed, the liquid capacity content of the auxiliary cylinder 43 is forced back through the pipe-lines 27 and 28. Through this action the filter 15 is freed from the crystal bed 12, and the rest of the capacity of the column can be filled via the pipe-line 16.

Figure 2:
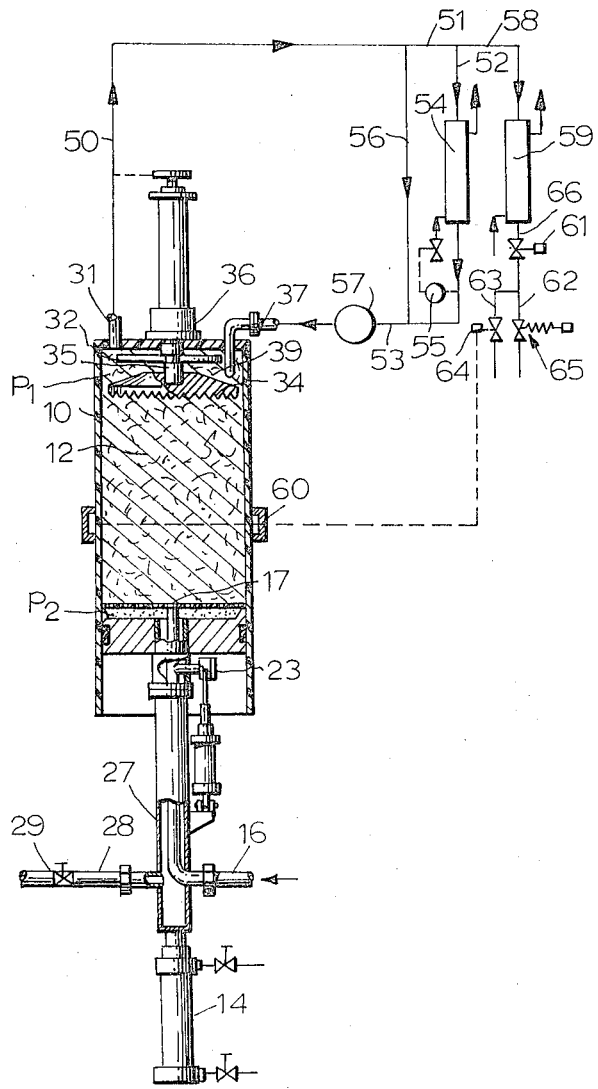
FIG. 2 shows schematically, an arrangement according to the invention with a scraping arrangement.

A second embodiment of the invention is shown schematically in FIG. 2. Just as in the embodiment of FIG. 1, the solid particles are again propelled and compressed together by the piston 13, and the liquid is discharged through the filter 15 of the piston 13, and the suspension is fed into the column through an opening 17 and pipe-line 16 in the piston 13. Now however, a liquid from the exterior is employed as a washing liquid. The particles as such are consequently discharged. The bed is scraped mechanically with the aid of a rotable disc 34 which is provided with scraper knives 33 (see FIG. 4) affixed to the scraper shaft 35. The scraper shaft 35 is driven by means of motor 36. The quantity of liquid fed to the suspension chamber 39, via the pipe-line 37, is sufficient so that the suspension formed by the mixing of the scraped-off particles with washing liquid can be freely pumped. For a good homogeneous suspension of the particles in the liquid, care is taken of this requirement by the provision of a stirring arm 32 affixed to the scraper shaft 35. The suspension is discharged via the pipeline 31. During the suction stroke of the piston 13, the valve 61 remains closed. This valve also remains closed during the first phase of the compression stroke. During the second phase of the compression stroke the desired consumption of washing liquid is fed via the pipe-line 37 and the discharge valve 65, so adjusted therefor that the desired washing effect, by the prevailing pressure in the suspension chamber on the particles in the compacted bed 12, is obtained.

The scraping capacity is regulated by the rotational speed of the scrapers (rotating disc 34 with scraper knives 33). The pressure exerted by the suction-compression cylinder 14 on the piston 13 is controlled by a pressure regulator in the pressure pipe-line for the cylinder 14. The pressure exerted by the piston 13 on the bed 12 must naturally be greater than the pressure exerted on the bed 12 by that of the suspension in the chamber therefor. The consumption of washing liquid through the bed 12 is determined by the fall in pressure of the washing liquid over the area of the bed.

It has been found that a good homogeneously firm pressed bed is essential for the good working of the washing column 10 as a whole. Therefor the retraction-suction stroke, during which the column 10 is filled to the stroke capacity with the crystal suspension, is followed by a first compression phase in which the crystal bed is built up on the filter 15, and a second compression phase in which the newly formed bed is compacted between the piston 13 and the already formed old bed.

The scraper knives must, at least during the first compression phase, remain stationary, otherwise insufficient counter-pressure is applied to the old bed.

At the beginning of the operation of the washing column there is still no formation of the crystal bed. The rotatable disc 34 must also serve to deliver sufficient counter-pressure to press out the crystal suspension and to seal off the column as much as possible. In the second compression phase, during which time the scraping and washing occurs, the rotatable disc 34 rotates and it is of importance that the ice, scraped from the crystal bed by the knives, is efficiently discharged. For this purpose the rotatable disc 14 is provided with angled slots 37.

It is of paramount importance that the washing liquid is equally distributed over the crystal bed in its application thereto, so that a free space must be maintained between the rotatable disc 34 and the bed 12. For this purpose the disc 34, which is closed except for the angled slots 37 there-through for the discharge of solid particles, e.g. ice, or liquid, is provided with substantially concentrically arranged grooves 38 on the side thereof adjacent the crystal bed 12. The scraper knives 33 are single edged or finely toothed so that the crystal bed 12 can be scraped off flat or nearly flat.

The pressure exerted on the crystal bed 12 by the suction-compression cylinder 14 serves to press the crystal bed 12 against the rotatable disc 34, that is to say against the application of force by the scraper knives, and to take up the liquid pressure difference $P_1-P_2$ (see FIG. 2). Accordingly the force necessary for the scraper knives is smaller, and more force is available for the pressure difference. It has been found that straight edged knives have need of a greater operational force since they begin to slip initially on taking up the pressure difference. That means that there is less power available for the washing; therefor the knives, of which there may be two for exmaple, are preferably provided with teeth such that the teeth of one knife are staggered with respect to the teeth of the other knife over a distance which is equal to half the pitch of the teeth of the other knife. Through this measure a smaller initial force is needed than with straight edged knives.

It is of the greatest importance that the washing liquid is maintained at the proper temperature. For frozen concentrations, and where the crystals are of ice, this temperature is 0° C. To achieve this, the ice scrapings from the column 10, together with the washing liquid is conducted through a closed circuit designated 31, 50, 51, 52, and 53, via a heat exchanger 54. A thermostat 55, the sensing probe of which is located at the exit from the heat exchanger 54 controls the on/off condition of the heating medium. A conduit or pipe 56 is arranged parallel with the heat exchanger and short-circuits (bypasses) the input and output of the heat exchanger. A portion of the ice scrape mixture thus mixes with the out-flow from the heat-exchanger. A pump 57 returns the washing liquid back to the washing column 10 via pipe 37, along with any make up wash liquid. Ice is therefor always present in the closed circuit, and the washing liquid is maintained at 0° C.

The portion of the melt that is not used for washing is tapped off via a pipe 58 through a second heat-exchanger 59, downstream of the first heat exchanger 54 wherein the ice is melted. The washing liquid temperature is maintained by this system in a simple manner.

The washing front must be maintained between the piston 13 and the rotatable disc 34. This can be achieved by a signal emitted from a photo-electric cell 60. It has been found that the washing front is maintained stable when rapid washing is effected. This can be achieved in the washing column 10 by locating a first magnetically operated valve 61 in the melt discharge pipe-line 66, and thereafter to divide the discharge pipe-line into two branches 62 and 63 where in branch 63 a second magnetically operated valve 64 is located and where in branch 62 an adjustable overflow discharge valve 65 is located.

The first magnetically operated valve 61 closes when the scraping arrangement of rotatable disc 34 is not in operation, i.e. rotating, and opens when it is in operation. The second magnetically operated valve 64 opens on command of the photoelectric cell 60. The overflow has to be adjusted at a pressure such that the knives remain just in operation. When washing is taking place, (second magnetically operated valve 64 closed), the maximum washing pressure is maintained. When the photoelectric cell 60 emits a signal indicating that the washing front is approaching too close to the piston 13, the washing pressure falls away through the opening of the second magnetically operated valve.

Figure 3:
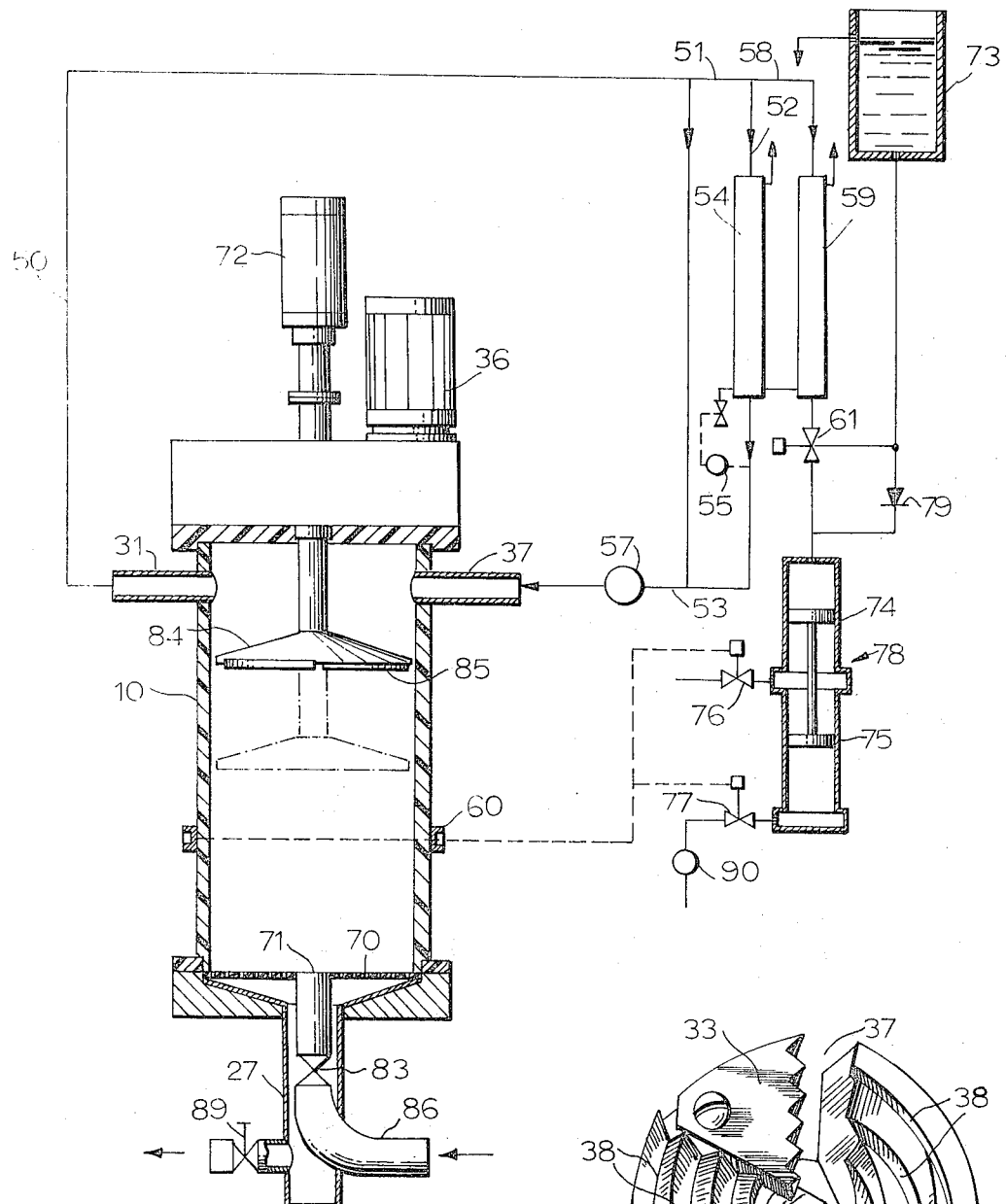
FIG. 3 shows schematically, another embodiment of the present invention with a scraping arrangement.

An alternative solution to the maintenance of a constant washing front is shown in conjunction with the embodiment of FIG. 3.

With larger cross-sections of the washing column, the suspension supply pipe-lines 16 and liquid phase discharge conduit 27 to and from the piston 13 respectively, become a construction problem. The supply and discharge pipe-lines must be designed to be flexible or telescopic. One solution, see FIG. 3, is not to adapt a moving piston in this way but to close one end of the column 10 with a porous plate 70 with one or more openings 71 therein for the supply of suspension to the column 10. The rotatable disc 84 is designed so that it can be axially displaced to make approximately the same length of stroke as the piston in the previously described embodiment of FIG. 2.

In the operation of the washing column three phases can be distinguished: a first phase in which the washing column 10 is filled (knife going from lowest position (shown in dotted lines) to highest position); a second phase in which compression of the crystal bed takes place which can be regulated, for example, by means of a timing clock (not shown) (the knife going from the highest position downwards); and finally a third phase in which scraping of the crystal bed takes place (the knife rotating and moving downwards for the rest of its stroke).

Figure 4:
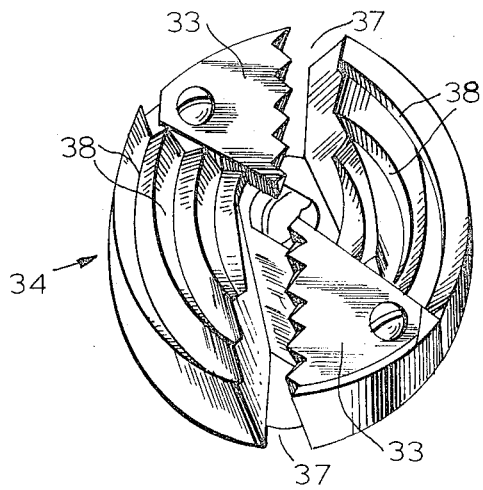
FIG. 4 shows a perspective view of one form of rotatable disc and scraper blades.

The operation of the arrangement is as follows:

The column 10 is filled with the suspension via the opened valve 83 in the supply line 86 and with the discharge line valve 89 is closed. The already described pressure applicator 41, see FIG. 1 forces some of the liquid back into the column via the porous plate 70 so that the suspension can come between the ice bed and the porous plate. The air cylinder 72 for moving the knife axially operates for upward movement, and through pressure of the suspension the ice and rotatable disc and scraper knives are lifted away from the porous plate and the space becoming available therebetween becomes filled with suspension. After filling the valve 83 closes and the discharge valve 89 opens. The pressure applicator fills, and the cylinder 72 operates to push the rotatable disc, such as illustrated in FIG. 4 with the ice bed toward the porous plate 20.

The suspension liquid, through these actions, is squeezed out and the new portion of the bed is compacted. After a variably adjustable time period the rotatable disc 84 and scraper knives 85 rotates such that the disc approaches the porous plate 70 until the end of the stroke when filling can begin anew.

73 is a container with spill-over conduit.

During the phases of filling and compression, the washing liquid circuit is in open connection with the container 73 via the three-way valve 61. The fluctuations in the volume of water are completely buffered by the container 73 so that no air enters the circuit. During the phase in which the scraping takes place, the three-way valve 61 is switched so that the connection between the washing liquid circuit and the container 73 is interrupted. Pneumatic pressure is now applied to the piston 74 of pump 78. The piston 74 presses a certain quanity of washing liquid back into the washing liquid circuit, by which the washing front in the crystal bed is pressed down to the level of the photocell 60. The photocell 60 gives a signal to the effect that the pressure on the piston 75 is released. 76 and 77 are three-way valves for air to regulate the pneumatic pressure applied to the piston 75.

During the phases of filling and compression, (first and second phases) the three-way valve 61 is in a position whereby air is pressed into the upper part of pump 78 so that the piston 75 and consequently also the piston 74 is moved downwards. Water is now sucked into the space in the pump 78 above the piston 74 through the non-return valve 79. During the phase of scraping (phase three), the three-way valve 77 is in a position that air is pressed under the piston 75 and valve 76 is in a position to release the air pressure above piston 75, by which the piston 75 and consequently also the piston 74 is moved upwards pressing water through the three-way valve 61 into the washing circuit until the washing front has reached the level of the photocell 60. A pump 90 can be used to regulate the pressure.

An attendant advantage of this washing column is that the compressed air cylinder operating characteristics i.e. through its size, need only be sufficient to press out and compact the suspension and to apply pressure to the knives during scraping. The force exerted by the knives does not become lessened with a washing pressure difference over the area of the bed. The washing and scraping can therefore be accomplished at a faster rate.

It will be noted that the location of the valve 83 in the pipe-line 86 for the suspension and the adaption of the auxiliary cylinder 41, as described with reference to the embodiment of FIG. 1, can be adapted with the same advantage in conjunction with an axially displaceable disc and scraper arrangement.

While the washing column according to the present invention has been set forth by way of the foregoing specific embodiments, such embodiments are to be in no way limited but are to be construed as broadly as any and all equivalents commmensurate in scope with the appended claims.

We claim:

1. Apparatus for the separation and purification of solids from a suspension and for leaching solid particles comprising an impervious column including:
    a. piston means closing one end of said column and mounted for reciprocating movement within said column to compact the solid particles to a bed and advance said compacted bed of solid particles to the opposite end of said column during the compression stroke of said reciprocating movement, said piston means including:
        i. a surface facing the bed of solid particles;
        ii. filtering means on said surface which is selectively permeable for the liquid phase of said suspension;
        iii. feeding means in communication with said surface for feeding said suspension into said column, said feeding means including:
            a. at least one opening in said surface and
            b. at least one conduit in flow communication with said opening;
        iv. first discharge means for the removal of said liquid phase of said suspension from said column including at least one conduit in flow communication with said filtering means;
        v. valve means in said at least one conduit of said feeding means to pass said suspension to said column only during the suction stroke of said reciprocating movement;
        vi. valve means in said at least one conduit of said discharge means to remove said liquid phase of said suspension only during said compression stroke of said reciprocating movement;
        vii. a pressure applicator in communication with said first discharge means before said valve means in said at least one conduit of said first discharge means including a cylinder with a double acting piston and pressure applying means connected thereto for actuating said pressure applicator; and
    b. treating means at the opposite end of said column for treating successive portions of said bed to facilitate removal of the treated portion from said column and second discharge means at said opposite end of said column for the progressive removal of said successive portions of said bed.

2. The apparatus of claim 1 wherein said valve means in said at least one conduit of said feeding means is not more than three times the diameter of said conduit from said surface of said piston on the side of said piston opposite said bed of solid particles.

3. Apparatus according to claim 1 in which said treating means includes a rotating disc having scraping means and openings for passing the scraped-off portions through said disc, and means at said opposite end of said column for supplying washing liquid to said bed.

4. The apparatus of claim 3 further including means to maintain said rotating disc stationary during a first phase of said compression stroke of said piston and means to rotate said rotating disc during a second phase of said compression stroke of said piston.

5. The apparatus of claim 3 wherein said scraping means of said rotating disc includes at least one knife blade and said openings of said rotating disc are in the form of angled slots and the closed areas of said rotating disc include at least one concentric groove on the surface of said rotating disc in contact with said bed of solid particles.

6. The apparatus of claim 5 wherein each of said at least one knife blade has a single cutting edge.

7. The apparatus of claim 5 wherein each of said at least one knife blade is finely toothed.

8. The apparatus of claim 5 wherein there are at least two finely toothed knife blades such that the teeth of each knife is staggered with respect to the teeth of each of the remaining knives.

9. The apparatus of claim 8 wherein there are two knives on said rotating disc such that the teeth of one knife are staggered with respect to the teeth of the other knife over half the pitch of the teeth.

10. The apparatus of claim 3 wherein said second discharge means includes recycling means to recycle a portion of said washing liquid including solid particles therein and to maintain the temperature of said washing liquid at a predetermined temperature.

11. The apparatus of claim 10 wherein said recycling means includes:
    i. a first heat exchanger;
    ii. a first conduit connecting said discharge means to the inlet of said first heat exchanger;
    iii. a second conduit connecting the exit of said first heat exchanger and said discharge means;
    iv. a thermostat having its sensing probe located at the exit of said first heat exchanger and controlling the flow of heating medium there-through;
    v. a third conduit connecting said first conduit to said second conduit and adapted to bypass said first heat exchanger; and
    vi. means to feed said washing fluid from said second conduit to said column.

12. The apparatus of claim 11 wherein said second discharge means further includes a second heat exchanger located downstream of said first heat exchanger for melting said solid particles in said washing fluid and a discharge conduit connected to the exit of said second heat exchanger.

13. The apparatus of claim 12 wherein said discharge conduit includes a first automatically operated valve at the outlet end of which said discharge conduit divides into a first branch and a second branch; said first branch including a second automatically operated valve and said second branch including an adjustable overflow valve; first control means for closing said first automatically operated valve when said rotating disc is stationary and opening said first automatically operated valve when said rotating disc is rotating; and second control means including a photoelectric cell for opening and closing said second automatically operated valve in response to the location of the washing front in said column such that the second automatically operated valve is opened when the washing front approaches said piston.

14. The apparatus of claim 13 wherein each of said automatically operated valves is a magnetically operated automatic valve.

15. The apparatus of claim 12 wherein said discharge conduit includes an automatically operated three-way valve and control means therefor, said control means including a compressed air operated cylinder having a first automatically operated three-way valve through which air at a reduced pressure can be admitted to the upper side of said air operated cylinder and a second automatically operated three-way valve through which air at atmospheric pressure can be admitted to the lower side of said air operated cylinder.

16. The apparatus of claim 15 wherein each of said automatically operated three-way valves is a magnetically operated three-way valve.

17. The apparatus of claim 15 wherein each of said first and second automatically operated valve associated with said compressed air operated cylinder is controlled by a photoelectric cell which is adapted to control said valves in response to the location of the washing front in said column.

18. Apparatus for the separation and purification of solids from a suspension and for leaching or lixiviation of solid particles comprising an impervious column closed at one end with a filter, said filter having at least one passage there-through for the supply of a suspension of solid particles in a liquid to said column and at least one passage for the removal of said liquid phase of said suspension from said column; an axially displaceable rotating disc having scraping means at the opposite end of said column for treating successive portions of said solid particles to thereby facilitate removal of the treated portion from the column; discharge means at said opposite end of said column for the progressive removal of said successive portions of said solid particles; and washing fluid supply means at said opposite end of said column for supplying washing fluid to said solid particles; said rotating disc being axially displaceable to thereby act as compacting means for compacting said successive portions of said solid particles during its axial displacement in the direction of said solid particles prior to treating said successive portions of said bed with said rotating disc.

* * * * *